United States Patent

[11] 3,621,301

[72] Inventor James J. Tomczak
Burlington, Vt.

[21] Appl. No. 889,383
[22] Filed Dec. 31, 1969
[45] Patented Nov. 16, 1971
[73] Assignee International Business Machines Corporation
Armonk, N.Y.

[54] THRESHOLD-RESPONSIVE REGENERATIVE LATCHING CIRCUIT
4 Claims, 1 Drawing Fig.

[52] U.S. Cl. .......... 307/290, 307/235
[51] Int. Cl. .......... H03k 3/15, H03k 3/26
[50] Field of Search .......... 307/290, 235, 291

[56] References Cited
UNITED STATES PATENTS

| | | | |
|---|---|---|---|
| 3,054,910 | 9/1962 | Bothwell .......... | 307/290 X |
| 3,187,196 | 6/1965 | Corbell et al. .......... | 307/290 X |
| 3,443,127 | 5/1969 | Zimmerman .......... | 307/290 |

*Primary Examiner*—John S. Heyman
*Assistant Examiner*—John Zazworsky
*Attorney*—Sughrue, Rothwell, Mion, Zinn & Macpeak

ABSTRACT: A monolithic transistorized latching circuit which switches from its normal reset state to a set state in response to a predetermined change in a differential input current. The latching circuit is normally biased to its reset state by means of a threshold-biasing circuit electrically independent of the different current. This arrangement permits the latching circuit to reject common mode nose currents which may be contained in the differential input current.

PATENTED NOV 16 1971 3,621,301
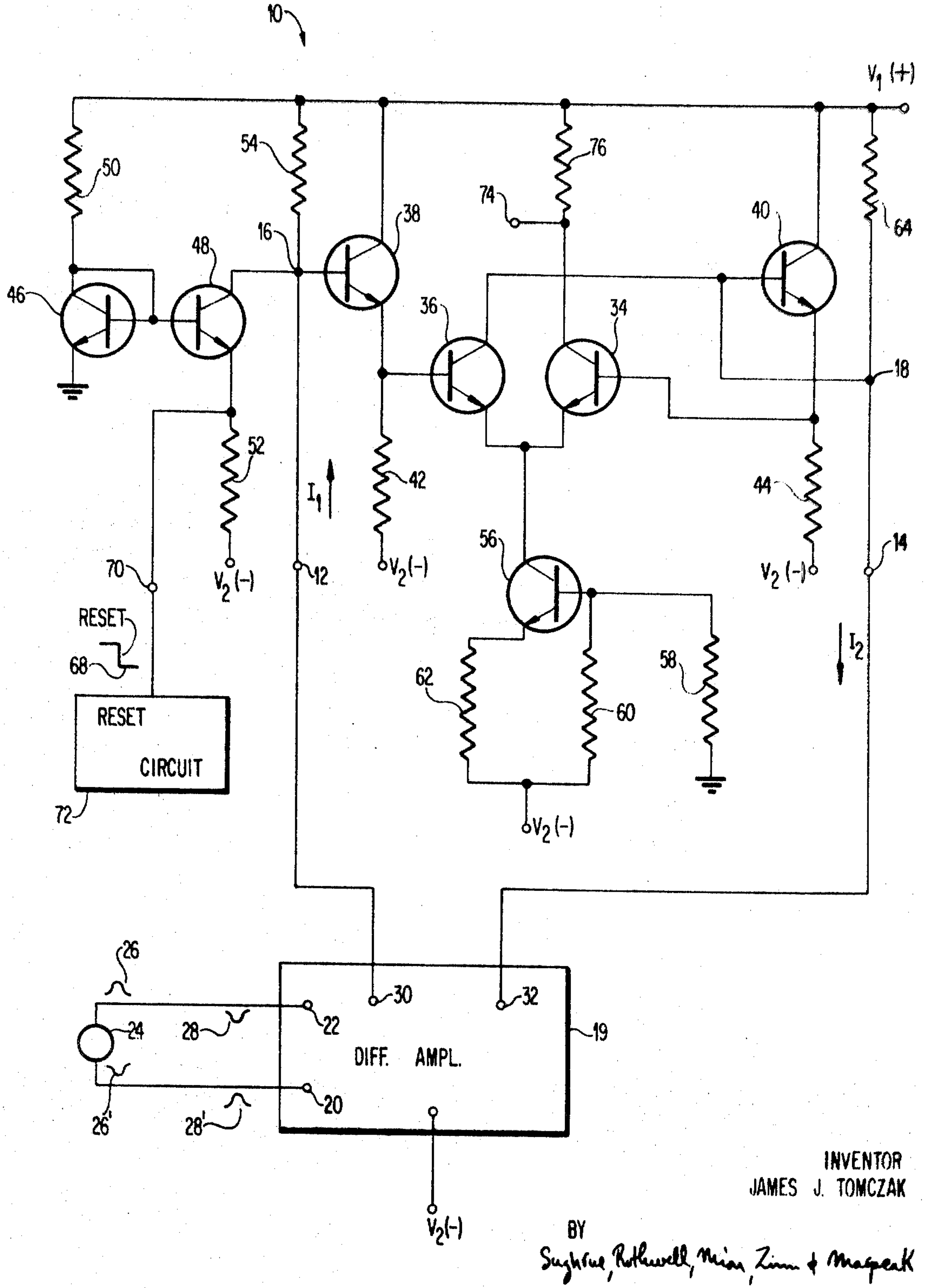
INVENTOR
JAMES J. TOMCZAK
BY
Sughrue, Rothwell, Mion, Zinn & Macpeak
ATTORNEYS

THRESHOLD-RESPONSIVE REGENERATIVE LATCHING CIRCUIT

CROSS REFERENCE TO PENDING APPLICATION

The following copending application is assigned to the assignee of the present application and discloses and claims a threshold responsive regenerative latching circuit of the type in which the threshold bias level is dependent upon the differential input current applied to the latching circuit:

Sensing Circuit—Norton et al. (IBM Docket BO969016), filed Jan. 10, 1969, having Ser. No. 790,247.

The following copending application is assigned to the assignee of the present application and discloses and claims a differential amplifier of the type which may be used as the input of the improved Threshold-Responsive Regenerative Latching Circuit of this invention:

Cross-Coupled Differential Amplifier—James J. Tomczak, Ser. No. 889,384 filed concurrently with this application on Dec. 31, 1969 (BU-9-69-011).

BACKGROUND OF THE INVENTION

1. Field of the Invention

The invention relates to transistorized latching circuits, and more particularly, to a monolithic threshold-responsive regenerative latching circuit having a high-noise rejection feature.

2. Description of the Prior Art

The tolerances on the characteristics of monolithic-diffused transistors and the values of monolithic-diffused resistors are rather low compared to the high tolerances achievable in discrete elements. Consequently, latching circuits have been designed in the past with a precision discrete resistor for controlling the threshold levels of the latching circuits.

SUMMARY OF THE INVENTION

The object of the invention is to provide an improved threshold responsive regenerative latching circuit having a higher noise rejection capacity than is available in the prior art circuits.

The invention may be broadly summarized as a latching circuit having a first bistable state and a second bistable state. The circuit is connected to two different current paths carrying input currents which are differentially varied. A biasing circuit electrically independent of the differential input currents normally applies a threshold bias to the latching circuit to place the latching circuit in its first bistable state. The circuit then responds to a predetermined change in the differential current to set the latching circuit in its second bistable state. With such an independent threshold-bias circuit, the latching circuit is unaffected by any common mode noise currents which may be contained in the differential current.

BRIEF DESCRIPTION OF THE DRAWING

The single FIGURE is a schematic diagram of a preferred embodiment of the invention.

DESCRIPTION OF THE PREFERRED EMBODIMENT

The FIGURE is a schematic diagram of a preferred embodiment of the invention in the form of a monolithic transistor latching circuit 10. However, it is to be understood that the circuit could be comprised of conventional discrete transistors and other circuit elements and that the active elements of the circuit could be either electronic valves or amplifiers, such as vacuum tubes.

The circuit has input terminals 12 and 14 which are adapted to be connected in series with a differential current source which provides a current $I_1$ flowing toward the point 16 and a current $I_2$ flowing away from the point 18. This differential current may be supplied by a differential amplifier 19, which may be of the type described and claimed in detail in the above Tomczak copending application. Such an amplifier has input terminals 20 and 22 which are connected to a source 24 of bipolar signals. Such a source may be the sense line in a magnetic-film memory or in a single row of cores in a plane of cores in a core memory. The bipolar signals are of the same magnitude but of opposite polarity such as signals 26, 26′ and signals 28, 28′. The differential amplifier disclosed in this copending application functions to provide at output terminals 30 and 32 a differential current signal whose polarity is independent of the polarity of the bipolar input signals, that is, with output terminal 30 positive relative to output terminal 32 regardless of the polarity of the bipolar signals applied to terminals 20, 22. Therefore, the currents $I_1$ and $I_2$ flow in the direction indicated in the drawing.

When the latching circuit 10 is in its reset state, transistor 34 is on, i.e., relatively conducting, and transistor 36 has just turned off, i.e. relatively nonconducting. Transistors 38 and 40 are always on, with transistor 40 functioning to keep transistor 36 out of saturation when transistor 36 turns on. The transistors 38 and 40 have matched base-to-emitter ($V_{be}$) drops and draw equal emitter currents through resistors 42 and 44, respectively. These resistors are also matched and utilize the ratio-tracking feature of monolithic resistors; i.e. even though their absolute values may change, the ratio of their values does not change. Since the $V_{be}$ of the transistors 38 and 40 are equal, the differential voltage from the base of transistor 36 to the base of transistor 34 is equal to the differential voltage from the base of transistor 38 to the base of transistor 40.

Transistors 46 and 48 together with resistors 50 and 52 provide the biasing arrangement for the latching circuit 10. The collector current of transistor 48 is controlled via its emitter current which is fixed by the value of resistor 52. The voltage drop across resistor 54 due to the collector current of transistor 48 lowers the base potential of transistor 36 relative to the base potential of transistor 34 so that transistor 36 is normally biased off; this condition defines the reset state of the latching circuit. The effect on the emitter current of transistor 48 of changes in the $V_{be}$ of transistor 49 is eliminated by the $V_{be}$ tracking action of the $V_{be}$ of transistors 46 and 48; i.e. even though the absolute values of the $V_{be}$'s may change, their ratios do not change. Also, the $V_{be}$ of transistor 46 and the $V_{be}$ of transistor 48 are matched, so that the emitter of transistor 48 is always at ground potential. The tracking of the ratio of resistor 50 and resistor 52 and of the ratio of resistor 54 and resistor 52 insures that the voltage across resistor 54 remains constant, thereby providing a constant differential voltage from the base of transistor 36 to the base of transistor 34.

Transistor 56 functions as a current source in the path of the emitters of transistors 36 and 34 and prevents the absolute variation in the $V_{be}$ drops of transistors 34, 36, 38 and 40 from changing the magnitude of the current available to the emitters of transistors 34 and 36. Resistors 58 and 60 provide a fixed-bias voltage at the base of transistor 56. Since the ratio of these two resistors track, the voltage at the base of transistor 56 remains essentially constant. The resistor ratio of resistors 62 and 64 also tracks to provide an unchanging negative-resistance characteristic at point 18.

When the current $I_1$ flows into point 16 and out of points 18, the voltage at the base of transistor 38 goes positive, thereby causing the voltage at the base of transistor 36 to go positive relative to the voltage at the base of transistor 34, and causing transistor 36 to turn on and transistor 34 to turn off. When transistor 36 turns on, its collector current flows through resistor 64 and turns transistor 34 further off, thereby causing transistor 36 to turn on harder. This regenerative action continues until transistor 34 is completely turned off and transistor 36 is completely turned on. The latch is now set and will remain in this state until it is reset by a reset level applied to reset terminal 70 by a reset circuit 72.

The terminal 70 is normally at ground level, and the reset level 68 is negative. This negative level causes current to flow out of the emitter of transistor 48 to in turn cause the collector current of transistor 48 to increase. This increased collector current in transistor 48 causes the base of transistor 38 to go more negative relative to the base of transistor 40, thereby causing transistor 36 to turn off and transistor 34 to turn on. Latching circuit 10 has now been returned to its original reset state with transistor 34 on and transistor 36 off.

The output of latching circuit 10 is taken at output terminal 74 connected between the juncture of resistor 76 and the collector of transistor 34. When the latching circuit is reset, transistor 34 is on and output terminal 74 is near ground potential. When the latching circuit is set, transistor 34 is off and output terminal 74 rising to the positive potential of $V_1$.

None of the transistors become saturated during operation of the latching circuit, i.e. all transistors operate in the class A region, therefore, no time is required to drive a transistor from saturation when switching a transistor from its "on" to its "off" state.

A positive-bias voltage $V_1$ and a negative-bias voltage $V_2$ are applied to the circuit as illustrated in the drawing. In one embodiment of the latching circuit 10, the following values were used:

$V_1$=+1.2 volts
$V_2$=−3.0 volts
$R_{42}$=1 K.ohms.
$R_{44}$=1 K.ohms
$R_{50}$=172 ohms
$R_{52}$=1.3 K.ohms
$R_{54}$=80 ohms
$R_{58}$=100 ohms
$R_{60}$=340 ohms
$R_{62}$=147 ohms
$R_{64}$=80 ohms
$R_{76}$=90 ohms Whereas in the prior art, the resistors would have been discrete precision resistors having very accurate values, the symmetry of the improved latching circuit, together with the ratio tracking of corresponding resistors and the $V_{be}$'s of corresponding transistors, permits the use of a monolithic circuit where the resistors and transistors may be diffused regions in a semiconductor substrate without any sacrifice in the threshold-bias stability of the latching circuit.

While the invention has been particularly shown and described with reference to a preferred embodiment thereof, it will be understood by those skilled in the art that various changes in form and details may be made therein without departing from the spirit and scope of the invention as defined in the following claims.

I claim:

1. A latching circuit having first and second bistable states and adapted to be connected to two different current paths carrying input currents which are differentially varied in response to an input signal, said latching circuit comprising:
   a. biasing means electrically independent of said current paths for normally applying a threshold bias to said latching circuit to maintain the latching circuit in said first bistable state, and
   b. means responsive to a predetermined differential change in said currents for causing said latching circuit to regeneratively switch to said second bistable state, whereby the threshold bias is unaffected by said currents.

2. A latching circuit as defined in claim 1 further comprising:
   a. first and second transistors having their emitters connected to a common point,
   b. a third transistor having its base connected to one of said current paths and to said biasing means and having its emitter connected to the base of said first transistor,
   c. a fourth transistor having its emitter connected to the base of said second transistor, said first transistor being normally relatively nonconducting and said second transistor being normally relatively conducting, thereby defining said first bistable state, said third and fourth transistors being always relatively conducting,
   d. first terminal means for applying a negative-bias voltage to said common point and the emitters of said third and fourth transistors, and
   e. second terminal means for applying a positive-bias voltage to the collectors of said first, second, third and fourth transistors and to the bases of said third and fourth transistors, so that said predetermined differential change in said currents renders said first transistor relatively conducting and said second transistor relatively nonconducting, whereby said latching circuit regeneratively switches to said second bistable state, and said fourth transistor prevents said first transistor from becoming saturated.

3. A latching circuit as defined in claim 3 further comprising:
   a. a reset circuit connected to said biasing means for applying a reset signal to said latching circuit, thereby to render said first transistor relatively nonconducting and said second transistor relatively conducting to return said latching circuit to said first bistable state.

4. A latching circuit as defined in claim 3 wherein said biasing means comprises a pair of matched transistors connected between said first and second terminal means for applying a fixed threshold-bias voltage to the base of said third transistor.

* * * * *

UNITED STATES PATENT OFFICE
CERTIFICATE OF CORRECTION

Patent No. 3,621,301 Dated November 16, 1971

Inventor(s) JAMES J. TOMCZAK

It is certified that error appears in the above-identified patent and that said Letters Patent are hereby corrected as shown below:

Abstract - line 6 - "different" should be "differential"

line 7 - "nose" should be "noise"

Column 2, line 38 - "transistor 49" should be "transistor 48"

line 59 - "points 18" should be "point 18"

Claims 3 and 4 should both be dependent from claim 2.

Signed and sealed this 23rd day of May 1972.

(SEAL)
Attest:

EDWARD M.FLETCHER,JR.
Attesting Officer

ROBERT GOTTSCHALK
Commissioner of Patents